United States Patent
Stimm (10) Patent No.: US 11,683,441 B2
(45) Date of Patent: *Jun. 20, 2023

(54) DIRECT COMMUNICATION BETWEEN AN IMAGE CAPTURE DEVICE AND A COMPUTING DEVICE

(71) Applicant: GoPro, Inc., San Mateo, CA (US)

(72) Inventor: Daryl Stimm, Encinitas, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/845,841

(22) Filed: Jun. 21, 2022

(65) Prior Publication Data

US 2022/0321826 A1  Oct. 6, 2022

Related U.S. Application Data

(63) Continuation of application No. 16/855,244, filed on Apr. 22, 2020, now Pat. No. 11,418,754.

(51) Int. Cl.
*H04N 5/765* (2006.01)
*H04N 23/00* (2023.01)
*H04W 84/12* (2009.01)

(52) U.S. Cl.
CPC ............ *H04N 5/765* (2013.01); *H04N 23/00* (2023.01); *H04W 84/12* (2013.01)

(58) Field of Classification Search
CPC .................................................. H04N 5/765
USPC ..................................................... 348/207.1
See application file for complete search history.

(56) References Cited

U.S. PATENT DOCUMENTS 11,418,754 B1  8/2022  Stimm
2016/0021230 A1  1/2016  Watanabe

*Primary Examiner* — Joel W Fosselman
(74) *Attorney, Agent, or Firm* — Esplin & Associates, PC (57) ABSTRACT

An image capture device may be physically connected to a computing device using a data cable. The image capture device may masquerade as an ethernet card to the computing device over the physical connection. The image capture device may communicate with the computing device over the physical connection using a wireless communication protocol.

20 Claims, 5 Drawing Sheets

METHOD 200

201 Masquerade an image capture device as an ethernet card to a computing device over a physical data connection.

202 Associate the image capture device with a first IP address, and associate the computing device with a second IP address.

203 Communicate with the computing device using a wireless communication protocol over the physical data connection based on the first IP address and the second IP address.

DIRECT COMMUNICATION BETWEEN AN IMAGE CAPTURE DEVICE AND A COMPUTING DEVICE

FIELD

This disclosure relates to communication between an image capture device and a computing device over a physical data connection using a wireless communication protocol.

BACKGROUND

A remote connection between an image capture device and a computing device may have insufficient bandwidth and/or stability to enable reliable and fast transfer of data between the image capture device and the computing device. A physical connection between an image capture device and a computing device may require use of proprietary protocol, software, and/or hardware to enable transfer of data between the image capture device and the computing device.

SUMMARY

This disclosure relates to image capture devices that directly connects to a computing device. An image capture device may include a housing. The housing may carry one or more of an image sensor, an optical element, a data port, and/or other components. The optical element may guide light within a field of view to the image sensor. The image sensor may generate a visual output signal conveying visual information defining visual content based on light that becomes incident thereon. The data port may connect to a data cable, which may be connected to the computing device to establish a physical data connection between the image capture device and the computing device. The image capture device may be masqueraded as an ethernet card to the computing device over the physical data connection. The image capture device may be associated with a first IP address. The computing device may be associated with a second IP address. The image capture device may communicate with the computing device using a wireless communication protocol over the physical data connection based on the first IP address and the second IP address, and/or other information.

An electronic storage may store information relating to image capture device, information relating to computing device, information relating to data port, information relating to physical data connection, information relating to masquerading the image capture device as an ethernet card, information relating to ethernet card, information relating to IP address, information relating to wireless communication protocol, information relating to communication over physical data connection using wireless communication protocol, and/or other information.

The housing may carry one or more components of the image capture device. The housing may carry (be attached to, support, hold, and/or otherwise carry) one or more of an image sensor, an optical element, a data port, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The data port may be configured to connect to a data cable and/or other cables. The data cable may be configured to be connected to the computing device to establish a physical data connection between the image capture device and the computing device. In some implementations, the data port may include a USB port. In some implementations, the image capture device may receive power from the computing device over the data cable.

The processor(s) may be configured by machine-readable instructions. Executing the machine-readable instructions may cause the processor(s) to facilitate directly connecting to a computing device. The machine-readable instructions may include one or more computer program components. The computer program components may include one or more of a masquerade component, an association component, a communication component, and/or other computer program components.

The masquerade component may be configured to masquerade the image capture device as another device. The masquerade component may be configured to masquerade the image capture device as an ethernet card to the computing device over the physical data connection.

The association component may be configured to associate different devices with different IP addresses. The association component may be configured to associate the image capture device with a first IP address and/or other IP addresses. The association component may be configured to associate the computing device with a second IP address and/or other IP addresses.

The communication component may be configured to communicate with another device over the physical data connection. The communication component may be configured to communicate with the computing device over the physical data connection. The communication component may be configured to communicate with the computing device using one or more wireless communication protocols over the physical data connection based on the first IP address, the second IP address, and/or other information. In some implementations, a wireless communication protocol may include Wi-Fi protocol.

In some implementations, communication between the image capture device and the computing device using the wireless communication protocol over the physical data connection may include data transfer communication between the image capture device and the computing device. The data transfer communication between the image capture device and the computing device includes may include transfer of information defining the visual content captured by the image capture device, transfer of information defining edit to the visual content captured by the image capture device, and/or transfer of other information.

In some implementations, communication between the image capture device and the computing device using the wireless communication protocol over the physical data connection may include command transfer communication between the image capture device and the computing device.

In some implementations, availability of the communication between the image capture device and the computing device using the wireless communication protocol over the physical data connection may be checked using Bluetooth communication and/or other communication.

In some implementations, one or more additional communication protocols and/or one or more alternative communication protocols may be used to communicate with the computing device over the physical data connection. In some implementations, an additional communication protocol or an alternative communication protocol may include media transfer protocol.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
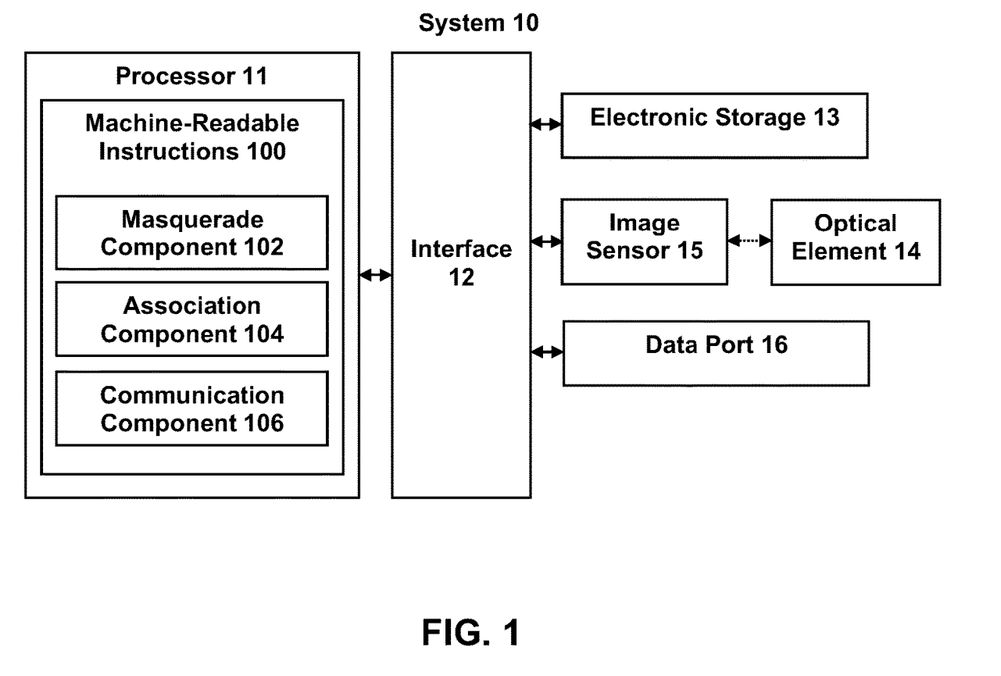
FIG. 1 illustrates an example system that directly connects to a computing device.

FIG. 1 illustrates a system 10 for directly connecting to a computing device. The system 10 may include one or more of a processor 11, an interface 12 (e.g., bus, wireless interface), an electronic storage 13, an optical element 14, an image sensor 15, a data port 16, and/or other components. The system 10 may include and/or be part of an image capture device. The image capture device may include a housing, and one or more of the optical element 14, the image sensor 15, the data port 16, and/or other components of the system 10 may be carried by the housing the image capture device. The optical element 14 may guide light within a field of view to the image sensor 15. The image sensor 15 may generate a visual output signal conveying visual information defining visual content based on light that becomes incident thereon. The data port 16 may connect to a data cable, which may be connected to the computing device to establish a physical data connection between the image capture device and the computing device. The image capture device may be masqueraded by the processor 11 as an ethernet card to the computing device over the physical data connection. The image capture device may be associated with a first IP address by the processor 11. The computing device may be associated with a second IP address by the processor 11. The image capture device may communicate with the computing device using a wireless communication protocol over the physical data connection based on the first IP address and the second IP address, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to image capture device, information relating to computing device, information relating to data port, information relating to physical data connection, information relating to masquerading the image capture device as an ethernet card, information relating to ethernet card, information relating to IP address, information relating to wireless communication protocol, information relating to communication over physical data connection using wireless communication protocol, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the data port 16 of the system 10 may be carried by the housing of the image capture device. The housing may carry other components, such as the processor 11 and the electronic storage 13.

Figure 3:
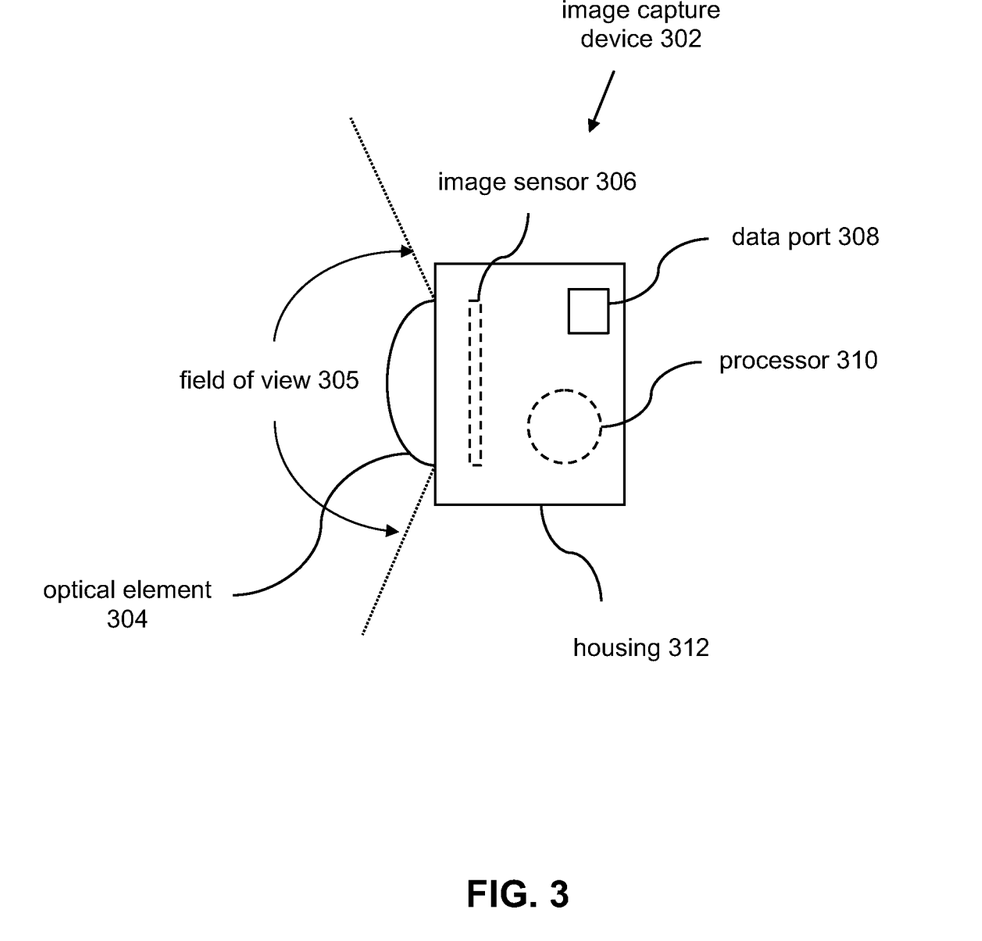
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a data port 308, a processor 310, and/or other components.

One or more components of the image capture device 302 may be the same as, be similar to, and/or correspond to one or more components of the system 10. For example, the processor 308 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The data port 308 may be the same as, be similar to, and/or correspond to the data port 16. The housing may carry other components, such as the electronic storage 13. The image capture device 302 may include other components not shown in FIG. 3. For example, the image capture device 302 may include one or more sound sensors configured to capture audio content. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The data port 308 may refer to a port that serves as an interface between the image capture device 302 and other devices, such as computing devices. The data port 308 may include a port that serves as an interview between the image capture device 302 and other devices to enable transfer of information between the image capture device 302 and other devices. A computing device may refer to may refer to electronic devices that provides computing capabilities, such as a computer (e.g., desktop computer, laptop computer), a tablet, a smartphone, a smartwatch, and/or other types of computing device. The data port 308 may include one or more different types of ports to provide cable connection interfaces, such as a USB port (e.g., USB-A, USB-B, USB-C), a lightning port, and/or other types of ports.

The data port 308 may be configured to connect to a data cable and/or other cables. A data cable may refer to a physical media that allows transfer/transmission of information between different computing devices connected by the data cable. The data cable 308 may be configured to be connected to the image capture device 302 via the data port 308. The data cable may be configured to be connected to a computing device (e.g., via one or more data ports of the computing device) to establish a physical data connection (rather than a wireless data connection) between the image capture device 302 and the computing device. The data cable 308 may provide the physical data connection between the image capture device 302 and the computing device.

In some implementations, the data port 308 may enable transfer of power between the image capture device 302 and the computing device. For example, the image capture device 302 may receive power from the computing device over the data cable. For instance, when the image capture device 302 is physically connected to a computing device via the data port 308 to send and/or receive information, the image capture device may also receive power from the computing device. Such reception of power from the computing device may enable the image capture device 302 to offload content to the computing device without loosing power/battery charge.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

Figure 4:
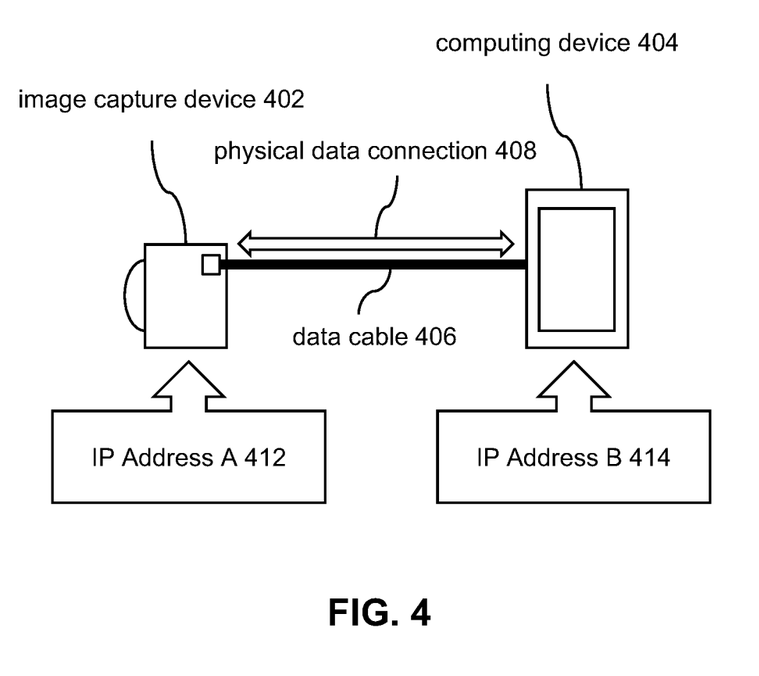
FIG. 4 illustrates an example physical data connection between an image capture device and a computing device.

For example, the image capture device 302 may communicate with a computing device over a physical data connection between the image capture device 302 and the computing device using a wireless communication protocol. FIG. 4 illustrates an example physical data connection 408 between an image capture device 402 and a computing device 404. A data cable 406 may be connected to the image capture device 402 (e.g., via one or more data ports of the image capture device 402) and may be connected to the computing device 404 (e.g., via one or more data ports of the computing device). The data cable 406 between the image capture device 402 and the computing device 404 may establish the physical data connection 408 between the image capture device 302 and the computing device.

The image capture device 402 may be masqueraded as an ethernet card to the computing device 404 over the physical data connection 408. The image capture device 402 may be associated with an IP address A 412, and the computing device 404 may be associated with an IP address B 414. The image capture device 402 may communicate with the computing device 404 using a wireless communication protocol over the physical data connection 408 based on the IP address A 412 of the image capture device 402 and the IP address B 404 of the computing device 404, and/or other information. For example, use of the wireless communication protocol over the physical data connection 408 may enable the image capture device 402 and the computing device 404 to communicate through the data cable 406 as if they were connected wirelessly (e.g., through WiFi). Use of the wireless communication protocol over the physical data connection 408 may enable the image capture device 402 and the computing device 404 to communicate through the data cable 406 without having to go through wireless connection process (e.g., image capture device 402 setting up network and broadcast SSID, the computing device 404 connecting to the network, the image capture device 402 authenticating the access credential of the computing device 404 to join the network).

Communication between the image capture device 402 and the computing device 404 may include transfer of information defining content (e.g., visual content, audio content) captured by the image capture device 402. Communication between the image capture device 402 and the computing device 404 may include transfer of information defining command from one device to the other (e.g., command to start, change, and/or end an operation of the image capture device 402 from the computing device 404, or vice versa).

Such use of physical data connection 408 between the image capture device 402 and the computing device 404 may provide benefit over use of wireless data connection between the image capture device 402 and the computing device 404 to transfer information. For example, using wireless data connection for communication between the image capture device 402 and the computing device 404 may require the image capture device 402 to turn on and use wireless communication components (turn on WiFi or Bluetooth chips on the image capture device 402, which may cause a drain on the battery of the image capture device 402. Using the physical data connection 408, on the other hand, may not require such drain on battery and may be used to supply power to the battery (recharge the battery).

Using wireless data connection for communication between the image capture device 402 and the computing device 404 may require the image capture device 402 and the computing device 404 to perform wireless network setup and wireless network authentication procedure to enable communication between the devices. Using the physical data connection 408, on the other hand, may not require setup of wireless network and wireless network authentication procedure.

Using wireless data connection for communication between the image capture device 402 and the computing device 404 may restrict the image capture device 402 and/or the computing device 404 from being connected to other networks. For instance, to connect to the image capture device 402 wirelessly, the computing device 404 may need to stop its wireless connection to the Internet. Using the physical data connection 408, on the other hand, may enable the image capture device 402 and/or the computing device 404 to be connected to other devices and/or to the Internet (e.g., using wireless connection, using other wired connection).

Additionally, wireless connection (e.g., WiFi connection, Bluetooth connection) between the image capture device 402 and the computing device 404 may have less bandwidth (resulting in slower information transfer speed) and/or less stability (resulting in dropped communication) than the physical data connection 408. Using the physical data connection 408, on the other hand, may enable the image capture device 402 and/or the computing device 404 to communicate at higher rate/using higher bandwidth, and with greater stability in connection.

Using a wireless communication protocol over the physical data connection 408 between the image capture device 402 and the computing device 404 may provide benefit over using other communication protocol for physical data connections. Using a wireless communication protocol over the physical data connection 408 may enable more capabilities than using other communication protocol for physical data connections. For example, the wireless communication protocol may enable more capabilities in types of information that may be exchanged and/or how the information is exchanged than other communication protocol for physical data connections, such as the Media Transfer Protocol.

For example, the Media Transfer Protocol may restrict transformation of information between the image capture device 402 and the computing device 404 to viewing the list of media stored at the image capture device 402 from the computing device 404 or downloading media stored at the image capture device 402 to the computing device 404. The wireless communication protocol may enable, in addition to enabling viewing list of media stored at the image capture device 402 from the computing device 404 and/or downloading media stored at the image capture device 402 to the computing device 404, previewing and/or editing of media (e.g., visual content, audio content) stored at the image capture device 402 from the computing device 404.

As another example, using custom/proprietary communication protocol for physical data connections, may require specific software and/or hardware (e.g., MFI chip) to enable the communication. Using custom/proprietary communication protocol for physical data connections may require communication framework to be developed to use the custom/proprietary communication protocol to enable different types of information transfer between the image capture device 402 and the computing device 404. Using a wireless communication protocol over the physical data connection 408 may enable the image capture device 402 and the computing device 404 to utilize existing software solution that has been built for wireless communication, such as web-browser technology built for WiFi. Using a wireless communication protocol over the physical data connection 408 may enable the image capture device 402 to communicate with variety of different computing devices (e.g., computing devices running different operating systems, such as Windows, MacOS, Android, Linux).

Referring back to FIG. 1, the processor 11 (or one or more components of the processor 11) may be configured to obtain information to facilitate directly connecting to a computing device. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate directly connecting to a computing device. The machine-readable instructions 100 may include one or more computer program components. The machine-readable instructions 100 may include one or more of a masquerade component 102, an association component 104, a communication component 106, and/or other computer program components.

The masquerade component 102 may be configured to masquerade the image capture device as one or more other devices. For example, the masquerade component 102 may be configured to masquerade the image capture device as an ethernet card (ethernet adapter) to the computing device over the physical data connection. For example, referring to FIG. 4, the image capture device 402 may be masqueraded as an ethernet card to the computing device 404 over the physical data connection 408. Masquerading the image capture device as an ethernet card may include disguising the image capture device as an ethernet card. Masquerading the image capture device as an ethernet card may include controlling the data interface for the data port 16 (e.g., USB interface for USB port) to adhere to wireless communication protocol (e.g., ethernet protocol). Masquerading the image capture device as an ethernet card may include instructing the data port 16 (e.g., USB port) at the kernel level that the image capture device is an ethernet card. Masquerading the image capture device as an ethernet card to the computing device may include spoofing the image capture device into tricking the computing device so that the computing device sees the image capture device as an ethernet card. Masquerading the image capture device as an ethernet card to the computing device over the physical data connection may include sending information to the computing device that makes the computing device see the image capture device as an ethernet card.

The association component 104 may be configured to associate different devices with different IP addresses. For example, the association component 104 may be configured to associate the image capture device with an IP address, and associate the computing device with another/different IP address. Associating a device with an IP address may include one or more of connecting the device with the IP address, involving the device with the IP address, assigning the IP address to the device, receiving the IP address of the device, confirming the IP address of the device, and/or other associating of the device with the IP address. An IP address associated with a device may be a static IP address or a dynamic IP address. Association of IP addresses with the image capture device and the computing device may enable the image capture device and the computing device to communicate with each other using a wireless communication protocol. For example, association of IP addresses with the image capture device and the computing device may enable the image capture device and the computing device to communicate with each other over the physical data connection as if they were connected through WiFi/wireless network.

In some implementations, a device may look for IP address(es) associated with other device(s), and the device may determine that the other device(s) are connected to it based on detecting the IP address(es). For example, the computing device may detect the IP address associated with the image capture device, and may determine that the image capture device is connected to the computing device through the physical data connection based on detection of the IP address associated with the image capture device. The computing device may automatically run one or more operations (e.g., searching for new media on the image capture device, download a list of media on the image capture device, opening a media sharing software) based on determination that the image capture device is connected to the computing device.

The communication component 106 may be configured to communicate with another device over the physical data connection. For example, the communication component 104 may be configured to communicate with the computing device over the physical data connection. The communication component 104 may be configured to communicate with the computing device using one or more wireless communication protocols over the physical data connection based on the IP address associated with the image capture device, the IP address associated with eh computing device, and/or other information. The communication component 104 communicating with the computing device may enable and/or include image capture device communicating with the computing over the physical data connection using the wireless communication protocol(s). A wireless communication protocol may refer to a set of rules that allow two or more devices to transmit information wirelessly/without physical data connection. A wireless communication protocol may define format for exchanging information (e.g., message format). In some implementations, a wireless communication protocol may include Wi-Fi protocol.

For example, referring to FIG. 4, the image capture device 402 and the computing device 404 may communicate with each other over the physical data connection 408 using WiFi protocol. Using WiFi protocol over the physical data connection 408 may enable the image capture device 402 and the computing device 404 to communicate using technology built for WiFi communication, while not being restricted by technical limitations of WiFi, such as limited bandwidth and/or unstable connection. Using WiFi protocol over the physical data connection 408 may enable the image capture device 402 to receive power from the computing device 404, and allow the image capture device 402 to exchange information with the computing device 404 without losing power and/or while recharging its battery. Use of other wireless communication protocols are completed.

In some implementations, communication between the image capture device and the computing device using the wireless communication protocol over the physical data connection may include data transfer communication between the image capture device and the computing device. Data transfer communication may refer to communication for transferring data from one device to another device. Data transfer communication may include communication that transfers data from the image capture device to the computing device and/or communication that transfers data from the computing device to the image capture device. For example, data transfer communication between the image capture device and the computing device may include transfer of information defining content (e.g., visual content, audio content) captured by the image capture device. Data transfer communication between the image capture device and the computing device may include transfer of information defining edit to the content (e.g., visual content, audio content) captured by the image capture device. Transfer of other data are contemplated.

In some implementations, communication between the image capture device and the computing device using the wireless communication protocol over the physical data connection may include command transfer communication between the image capture device and the computing device. Command transfer communication may refer to communication for transferring command from one device to another device. Command transfer communication may include communication that transfers command from the image capture device to the computing device and/or communication that transfers command from the computing device to the image capture device. For example, command transfer communication between the image capture device and the computing device may include transfer, from the computing device, of information defining one or more commands to operate the image capture device. Command transfer communication between the image capture device and the computing device may include transfer, from the image capture device, of information defining one or more commands to operate the computing device. Transfer of other commands are contemplated.

Figure 5:
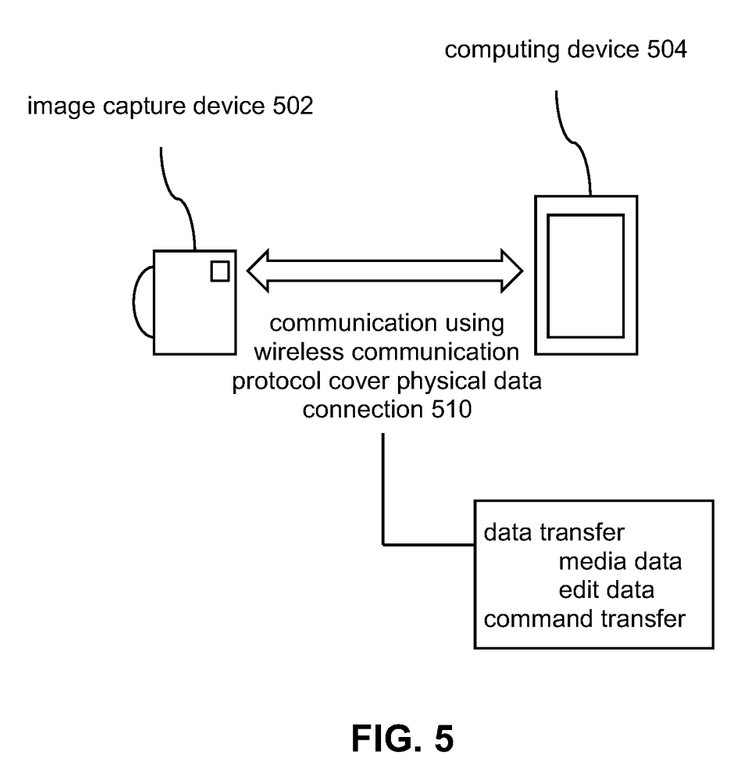
FIG. 5 illustrates example data transfer between an image capture device and a computing device using wireless communication protocol over physical data connection.

FIG. 5 illustrates example data transfer between an image capture device 502 and a computing device 504 using wireless communication protocol over physical data connection. Communication using wireless communication protocol over physical data connection 510 may include data transfer, such as transfer of media data and/or edit data, command transfer, and/or other information transfer.

For example, the computing device 504 may utilize communication using wireless communication protocol over physical data connection 510 to preview and/or playback media (e.g., image file, video file, audio file) stored at the image capture device 502. The storage of the image capture device 502 may be treated as a network connected storage device, from which the computing device 504 accesses the media. The computing device 504 may edit the media stored at the image capture device 502 without offloading the media from the image capture device 502.

The edit to the media (e.g., to shorten the media, to make cuts in the media, to generate a new media, such as a video edit) may be stored as a list of edits (e.g., edit decision list). The list of edits may be transferred to the image capture device 502. The image capture device 502 may use the list of edits to perform the edits. The image capture device 502 may provide the list of edits to a computing device (e.g., the computing device 504, another computing device) to continue edits to the media. For instance, a user may initially connect an image capture device to a computer (e.g., laptop) to start creating a video edit based on videos stored in the image capture device. The list of edits may be transferred to and stored at the image capture device. The user may later connect the image capture device to the same computer (e.g., laptop) or a different computer (e.g., desktop, tablet, smartphone). The list of edits stored at the image capture deice may be used to continue work on the video edit.

In some implementations, the portions of the media that are needed to generate the video edit may be offloaded to the computing device 504. For example, the image capture device 502 may have in storage an hour of video footage. The video edit may utilize snippets of the video footage, and the snippets of the video footage may be transferred to the computing device 504. The computing device 504 may generate the video edit using the list of edits and the snippets of the video footage.

In some implementations, availability of the communication between the image capture device and the computing device using the wireless communication protocol over the physical data connection may be checked using Bluetooth communication and/or other communication. For example, the image capture device and the computing device may communicate using Bluetooth communication to determine whether the image capture device and the computing device are capable of communicating over the physical data connection using the wireless communication protocol. Based on the image capture device and the computing device being capable of communicating over the physical data connection using the wireless communication protocol, the communication over the physical data connection using the wireless communication protocol may be enabled/started when a data cable is connected between the image capture device and the computing device. Based on the image capture device and the computing device being incapable of communicating over the physical data connection using the wireless communication protocol, the communication over the physical data connection using another protocol (e.g., Media Transfer Protocol) may be enabled/started when a data cable is connected between the image capture device and the computing device.

In some implementations, one or more additional communication protocols and/or one or more alternative communication protocols may be used to communicate with the computing device over the physical data connection. An additional communication protocol may refer to a communication protocol that is used in addition to the wireless communication protocol to facilitate communication between the image capture device and the computing device over the physical data connection. For example, the additional communication protocol may include media transfer protocol, and the image capture device and the computing device may communicate over the physical data connection using the wireless communication protocol and the media transfer protocol. An alternative communication may refer to a communication protocol that is used in place of the wireless communication protocol to facilitate communication between the image capture device and the computing device over the physical data connection. For example, the alternative communication protocol may include media transfer protocol, and the image capture device and the computing device may communicate over the physical data connection the media transfer protocol, rather than using the wireless communication protocol. For instance, the image capture device and the computing device may switch between the wireless communication protocol and the media transfer protocol. Other additional communication protocol and alternative communication protocol are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. For example, one or more computer program component may be located within processing unit(s) of an image capture device and one or more computer program component may be located within processing unit(s) of a computing device.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
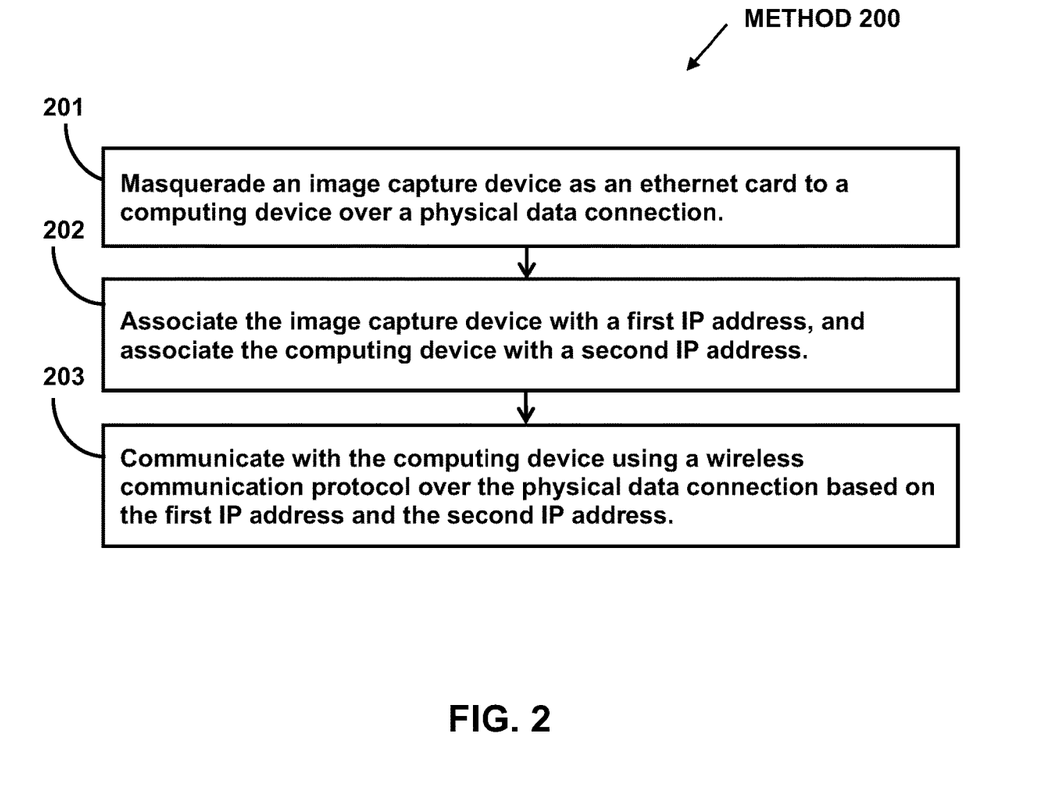
FIG. 2 illustrates an example method for directly connecting to a computing device.

FIG. 2 illustrates method 200 for directly connecting to a computing device. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a data port, and/or other components. The optical element may guide light within a field of view to the image sensor. The image sensor may generate a visual output signal conveying visual information defining visual content based on light that becomes incident thereon. The data port may connect to a data cable, which may be connected to the computing device to establish a physical data connection between the image capture device and the computing device.

At operation 201, the image capture device may be masqueraded as an ethernet card to the computing device over the physical data connection. In some implementation, operation 201 may be performed by a processor component the same as or similar to the masquerade component 102 (Shown in FIG. 1 and described herein).

At operation 202, the image capture device may be associated with a first IP address, and the computing device may be associated with a second IP address. In some implementations, operation 202 may be performed by a processor component the same as or similar to the association component 104 (Shown in FIG. 1 and described herein).

At operation 203, the image capture device may communicate with the computing device using a wireless communication protocol over the physical data connection based on the first IP address and the second IP address. In some implementations, operation 203 may be performed by a processor component the same as or similar to the communication component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for directly connecting an image capture device to a computing device, the system comprising:
   one or more physical processors configured by machine-readable instructions to:
   masquerade the image capture device as an ethernet card to the computing device over a physical data connection between the image capture device and the computing device, the physical data connection established via a data cable connected between the image capture device and the computing device;
   associate the image capture device with a first IP address; and
   associate the computing device with a second IP address;
   wherein communication between the image capture device and the computing device uses a wireless communication protocol over the physical data connection based on the first IP address and the second IP address.

2. The system of claim 1, wherein the image capture device receives power from the computing device over the data cable.

3. The system of claim 1, wherein the communication between the image capture device and the computing device using the wireless communication protocol over the physical data connection includes data transfer communication between the image capture device and the computing device.

4. The system of claim 3, wherein the data transfer communication between the image capture device and the computing device includes:
 transfer of information defining visual content captured by the image capture device; and
 transfer of information defining edit to the visual content captured by the image capture device.

5. The system of claim 1, wherein the communication between the image capture device and the computing device using the wireless communication protocol over the physical data connection includes command transfer communication between the image capture device and the computing device.

6. The system of claim 1, wherein the wireless communication protocol includes Wi-Fi protocol.

7. The system of claim 1, wherein availability of the communication between the image capture device and the computing device using the wireless communication protocol over the physical data connection is checked using Bluetooth communication.

8. The system of claim 1, wherein additional communication protocol or alternative communication protocol is used for the communication between the image capture device and the computing device over the physical data connection.

9. The system of claim 8, wherein the additional communication protocol or the alternative communication protocol includes media transfer protocol.

10. A method for directly connecting an image capture device to a computing device, the method performed by a computing system including one or more processors, the method comprising:
 masquerading, by the computing system, the image capture device as an ethernet card to the computing device over a physical data connection between the image capture device and the computing device, the physical data connection established via a data cable connected between the image capture device and the computing device;
 associating, by the computing system, the image capture device with a first IP address; and
 associating, by the computing system, the computing device with a second IP address;
 wherein communication between the image capture device and the computing device uses a wireless communication protocol over the physical data connection based on the first IP address and the second IP address.

11. The method of claim 10, wherein the image capture device receives power from the computing device over the data cable.

12. The method of claim 10, wherein the communication between the image capture device and the computing device using the wireless communication protocol over the physical data connection includes data transfer communication between the image capture device and the computing device.

13. The method of claim 12, wherein the data transfer communication between the image capture device and the computing device includes:
 transfer of information defining visual content captured by the image capture device; and
 transfer of information defining edit to the visual content captured by the image capture device.

14. The method of claim 10, wherein the communication between the image capture device and the computing device using the wireless communication protocol over the physical data connection includes command transfer communication between the image capture device and the computing device.

15. The method of claim 10, wherein the wireless communication protocol includes Wi-Fi protocol.

16. The method of claim 10, wherein availability of the communication between the image capture device and the computing device using the wireless communication protocol over the physical data connection is checked using Bluetooth communication.

17. The method of claim 10, wherein additional communication protocol or alternative communication protocol is used for the communication between the image capture device and the computing device over the physical data connection.

18. The method of claim 17, wherein the additional communication protocol or the alternative communication protocol includes media transfer protocol.

19. A system for directly connecting an image capture device to a computing device, the system comprising:
 one or more physical processors configured by machine-readable instructions to:
  masquerade the image capture device as an ethernet card to the computing device over a physical data connection between the image capture device and the computing device, the physical data connection established via a data cable connected between the image capture device and the computing device;
  associate the image capture device with a first IP address; and
  associate the computing device with a second IP address;
 wherein:
  communication between the image capture device and the computing device uses a wireless communication protocol over the physical data connection based on the first IP address and the second IP address; and
  the communication between the image capture device and the computing device using the wireless communication protocol over the physical data connection includes data transfer communication between the image capture device and the computing device, and command transfer communication between the image capture device and the computing device.

20. The system of claim 19, wherein:
 the image capture device receives power from the computing device over the data cable; and
 the data transfer communication between the image capture device and the computing device includes:
  transfer of information defining visual content captured by the image capture device; and
  transfer of information defining edit to the visual content captured by the image capture device.

* * * * *